United States Patent
Ahmad et al.

(10) Patent No.: US 10,237,812 B2
(45) Date of Patent: Mar. 19, 2019

(54) METHOD AND APPARATUS FOR SENDING AN AGGREGATED BEACON

(75) Inventors: Saad Ahmad, Montreal (CA); Jean-Louis Gauvreau, La Prairie (CA); Rocco DiGirolamo, Laval (CA); Zinan Lin, Melville, NY (US); Angelo A. Cuffaro, Laval (CA); Zaid Al-Khatib, Montreal (CA); Joseph Murray, Schwenksville, PA (US); Alexander Reznik, Titusville, NJ (US); Alpaslan Demir, East Meadow, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 53 days.

(21) Appl. No.: 13/034,472

(22) Filed: Feb. 24, 2011

(65) Prior Publication Data

US 2012/0026941 A1 Feb. 2, 2012

Related U.S. Application Data

(60) Provisional application No. 61/307,519, filed on Feb. 24, 2010, provisional application No. 61/308,201, (Continued)

(51) Int. Cl.
*H04W 48/16* (2009.01)
*H04W 16/14* (2009.01)
*H04W 48/12* (2009.01)

(52) U.S. Cl.
CPC ............ *H04W 48/16* (2013.01); *H04W 16/14* (2013.01); *H04W 48/12* (2013.01)

(58) Field of Classification Search
None
See application file for complete search history.

(56) References Cited

U.S. PATENT DOCUMENTS

| 6,275,517 | B1 | 8/2001 | Izumi |
| 7,123,924 | B2 | 10/2006 | Cuffaro |

(Continued)

FOREIGN PATENT DOCUMENTS

| EP | 2214433 B1 | 11/2012 |
| JP | 2005-151213 A2 | 6/2005 |

(Continued)

OTHER PUBLICATIONS

Arachchige et al., "An Asynchronous Neighbor Discovery Algorithm for Cognitive Radio Networks," the $3^{rd}$ IEEE Symposia on New Frontiers in Dynamic Spectrum Access Networks (DySPAN) (Oct. 2008).

(Continued)

*Primary Examiner* — Jae Y Lee
*Assistant Examiner* — Aixa A Guadalupe Cruz
(74) *Attorney, Agent, or Firm* — Volpe and Koenig, P.C.

(57) ABSTRACT

Techniques for sending an aggregated beacon in a cognitive wireless network are disclosed. A beacon device may segment beacon information and send beacon segments via a plurality of channels simultaneously. A certain information elements of the beacon information may be included in each beacon segment. Each beacon segment may include channel information for other beacon segments that are transmitted simultaneously. Alternatively, a discovery beacon may be transmitted in addition to a regular beacon. The discovery beacon may include information indicating an operating channel on which the regular beacon is transmitted. The discovery beacon may be transmitted using a predetermined channel bandwidth, with a smaller beacon interval than the regular beacon, or in a frequency hopping fashion. The discovery beacon may be sent on a channel selected based on a regulatory class and corresponding channel informa- (Continued)

tion. The discovery beacon may be transmitted on a side channel.

12 Claims, 12 Drawing Sheets

Related U.S. Application Data filed on Feb. 25, 2010, provisional application No. 61/333,440, filed on May 11, 2010, provisional application No. 61/418,251, filed on Nov. 30, 2010.

(56) References Cited

U.S. PATENT DOCUMENTS

| | | | |
|---|---|---|---|
| 7,907,566 B2 | 3/2011 | Ohuchi | |
| 7,986,742 B2* | 7/2011 | Ketchum et al. | 375/267 |
| 8,325,701 B2 | 12/2012 | Yamauchi et al. | |
| 2003/0185171 A1 | 10/2003 | Mullins et al. | |
| 2004/0179627 A1 | 9/2004 | Ketchum et al. | |
| 2005/0286446 A1 | 12/2005 | Barber | |
| 2006/0030318 A1 | 2/2006 | Moore et al. | |
| 2006/0073827 A1* | 4/2006 | Vaisanen | H04W 36/0055 455/436 |
| 2006/0089141 A1 | 4/2006 | Ho et al. | |
| 2007/0167140 A1* | 7/2007 | Grandhi et al. | 455/88 |
| 2008/0123588 A1 | 5/2008 | Rudolf et al. | |
| 2008/0205340 A1 | 8/2008 | Meylan et al. | |
| 2009/0059841 A1 | 3/2009 | Laroia et al. | |
| 2009/0168650 A1 | 7/2009 | Kesselman | |
| 2009/0232023 A1 | 9/2009 | Soffer et al. | |
| 2009/0232106 A1 | 9/2009 | Cordeiro et al. | |
| 2009/0323608 A1 | 12/2009 | Adachi et al. | |
| 2010/0016023 A1* | 1/2010 | Yamauchi | H04L 5/0037 455/562.1 |
| 2010/0061402 A1* | 3/2010 | van Zelst et al. | 370/474 |
| 2011/0075642 A1* | 3/2011 | Cordeiro | H04W 74/0816 370/338 |
| 2011/0149850 A1 | 6/2011 | Sashihara | |
| 2011/0158198 A1* | 6/2011 | Jeon | H04L 47/826 370/329 |
| 2011/0243190 A1 | 10/2011 | Nagata et al. | |

FOREIGN PATENT DOCUMENTS

| | | |
|---|---|---|
| JP | 2005142883 A2 | 6/2005 |
| JP | 2007-251854 A2 | 9/2007 |
| JP | 2008-258734 A2 | 10/2008 |
| JP | 2008-263335 A2 | 10/2008 |
| JP | 2009-135884 A2 | 6/2009 |
| JP | 2009-225053 A | 10/2009 |
| WO | 2007008572 A2 | 1/2007 |
| WO | 08002720 A2 | 1/2008 |
| WO | 2008/019140 A2 | 2/2008 |
| WO | 08106353 A2 | 9/2008 |
| WO | 09036217 A1 | 3/2009 |
| WO | WO2009038545 * | 3/2009 |
| WO | 2009095832 A1 | 8/2009 |
| WO | 09114628 A1 | 9/2009 |
| WO | 10/011062 | 1/2010 |
| WO | 10019679 A2 | 2/2010 |
| WO | 2010036595 A2 | 4/2010 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 10: Mesh Networking, IEEE P802.11s D4.01 (Feb. 2010).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6 GHz, IEEE P802.11ac D0.1 (Jan. 2011).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 6: Wireless Access in Vehicular Environments, IEEE Std. 802.11p-2010 (Jul. 2010).

Draft Standard for Information Technology—Telecommunications and information exchange between systems—Local and metropolitan area networks—Specific requirements; Part 15.4: Wireless Medium Access Control (MAC) and Physical Layer (PHY) Specifications for Low-Rate Wireless Personal Area Networks (WPANs); Amendment 3: Alternative Physical Layer Extension to support the Japanese 950 MHz bands, IEEE 802.15.4d-2009 (Apr. 2009).

IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 2007).

Kim et al., "Amendment Proposal for TV White Spaces Operation," IEEE 802.11-10/0263r2 (Apr. 13, 2010).

Krishnamurthy et al., "Brief Announcement: Synchronous Distributed Algorithms for Node Discovery and Configuration in Multi-channel Cognitive Radio Networks," 20th International Symposium on Distributed Computing (DISC), pp. 572-574 (Sep. 2006).

Krishnamurthy et al., "Neighbor Discovery in Multi-Receiver Cognitive Radio Networks," International Journal of Computers and Applications, pp. 50-57 (Jan. 2009).

Krishnamurthy et al., "Time-efficient distributed layer-2 auto-configuration for cognitive radio networks," Computer Networks 52, pp. 831-849 (Mar. 2008).

Leng et al., "A Novel Location-Service Protocol Based on κ-Hop Clustering for Mobile Ad Hoc Networks," IEEE Transactions on Vehicular Technology, vol. 56, No. 2 (Mar. 2007).

Luo et al., "Neighbor Discovery in Wireless Ad Hoc Networks Based on Group Testing," 46th Annual Allerton Conference (Sep. 23-26, 2008).

Mittal et al., "On Neighbor Discovery in Cognitive Radio Networks," Journal of Parallel and Distributed Computing, pp. 623-637 (2009).

Venkataraman et al., "Size-restricted cluster formation and cluster maintenance technique for mobile ad hoc networks," International Journal of Network Management, pp. 171-194 (Mar. 2007).

Chen et al., "CogMesh: A Cluster-Based Cognitive Radio Network," 2nd IEEE International Symposium on New Frontiers in Dynamic Spectrum Access Networks, (Apr. 17-20, 2007).

Cordeiro et al., "C-MAC: A Cognitive MAC Protocol for Multi-Channel Wireless Networks," 2nd IEEE International Symposium on New Frontiers in Dynamic Spectrum Access Networks, (Apr. 17-20, 2007).

IEEE P802.11ad/D1.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band, IEEE P802.11ad/D1.0 (Sep. 2010).

IEEE P802.11af/D1.0, Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D1.0 (Jan. 2011).

* cited by examiner

METHOD AND APPARATUS FOR SENDING AN AGGREGATED BEACON

CROSS REFERENCE TO RELATED APPLICATIONS

This application claims the benefit of U.S. provisional application Nos. 61/307,519 filed Feb. 24, 2010, 61/308,201 filed Feb. 25, 2010, 61/333,440 filed May 11, 2010, and 61/418,251 filed Nov. 30, 2010, the contents of which are hereby incorporated by reference herein.

BACKGROUND

A cognitive network is a network comprising a large number of wireless devices in which different devices may use different radio access technologies (RATs), (e.g., cellular, wireless local area network (WLAN), Bluetooth, Zigbee, etc.), and operate over multiple unlicensed bands and/or TV white space channels. These wireless devices which are radio flexible and radio agile are referred as cognitive nodes.

To communicate to each other, nodes of a cognitive network discover neighbors and know which channel(s) may be used to communicate with each other. In conventional wireless networks a neighbor discovery mechanism uses a default frequency channel. For example, IEEE 802.11p wireless access in vehicular environments (WAVE) uses a single dedicated control channel which is used in neighbor discovery and association.

Both passive and active scanning may be used to search for an access point (AP). In passive scanning, each device scans individual channels to find a beacon signal. Periodically, APs broadcast a beacon, and the scanning device receives these beacons and takes note of the corresponding signal strengths. The beacons contain information about the AP, including service set identifier (SSID), supported data rates, regulatory class, etc. The scanning device may use this information along with the signal strength to compare APs and select one with which to associate.

In active scanning, the device initiates the process by sending a probe request frame, and APs within a range respond with a probe response frame. Active scanning enables a device to receive an immediate response from the APs without waiting for a periodic beacon transmission.

A cognitive node may scan a large amount of spectrum to find an operating channel. More specifically, Federal Communications Commission (FCC) has opened about 300 MHz of available spectrum ranging from 54-698 MHz, in a band referred to as TV White Space (TVWS). When a wireless device operating in this band is initially switched on, it may not have any knowledge about the operating channel and the bandwidth of the channel being used. An 802.11 device, for example, may operate in multiple channel spacing, (i.e., 5, 10, 20, and 40 MHz). The device may scan the channels with different channel spacing permutations to find the operating channel.

The FCC defined three devices that may operate in the TVWS band: a Mode I device, a Mode II device, and a sensing-only device. In addition, a TV bands database is used to keep track of which channels are available in a specific geographic location. TVWS-capable devices may query the TV bands database to determine a list of available channels in their location.

A Mode I device is a TVWS device that does not use an internal geo-location capability and access to the TV bands database to obtain a list of available channels. A Mode I device may obtain a list of available channels on which it may operate from either a fixed TVWS device or a Mode II device.

A Mode II device is a TVWS device that uses an internal geo-location capability and access to the TVWS database, either through a direct connection to the Internet or through an indirect connection to the Internet by way of a fixed TWWS device or another Mode II TVWS device, to obtain a list of available channels. A Mode II device may select a channel by itself and initiate and operate as part of a network of TVWS devices, transmitting to, and receiving from, one or more fixed TVWS devices or personal/portable TVWS devices. A Mode II device may provide its list of available channels to a Mode I device for operation by the Mode I device.

A sensing-only device is a TVWS device that uses spectrum sensing to determine a list of available channels.

In an 802.11 WLAN, the devices may operate under the regulatory class. Regulatory class for the orthogonal frequency division multiplex (OFDM) is an index into a set of values for radio equipment sets of rules. It includes the following parameters: the channel starting frequency, (which is a frequency used together with a channel number to calculate a channel center frequency), channel spacing, (which is the frequency difference between non-overlapping adjacent channel center frequencies), the channel set, (which is the list of integer channel numbers that are legal for a regulatory domain and class), the transmit power limit, (which is the maximum transmit power that is legal for a regulatory domain and class), and an emission limit set, (which is an enumerated list of spectral masks and emissions limits that are legal for a regulatory domain).

SUMMARY

Embodiments for sending an aggregated beacon in a cognitive wireless network are disclosed. A beacon device may segment beacon information and send beacon segments via a plurality of channels simultaneously. Certain information elements of the beacon information may be included in each beacon segment. Each beacon segment may include channel information for other beacon segments that are transmitted simultaneously. The channels used for the aggregated beacon transmission may be periodically changed and/or may follow a predetermined pattern.

Alternatively, a discovery beacon may be transmitted in addition to a regular beacon. The discovery beacon may include information indicating an operating channel on which the regular beacon is transmitted. The discovery beacon may be one of the beacon segments. The discovery beacon may be transmitted using a predetermined channel bandwidth, with a smaller beacon interval than the regular beacon, or in a frequency hopping fashion. The discovery beacon may be sent on a channel selected based on a regulatory class and corresponding channel information. The discovery beacon may be transmitted on a side channel.

The aggregated beacon or discovery beacon may also be used in a self organizing network or a machine-to-machine communication network.

BRIEF DESCRIPTION OF THE DRAWINGS

A more detailed understanding may be had from the following description, given by way of example in conjunction with the accompanying drawings wherein.

DETAILED DESCRIPTION

Figure 1A:
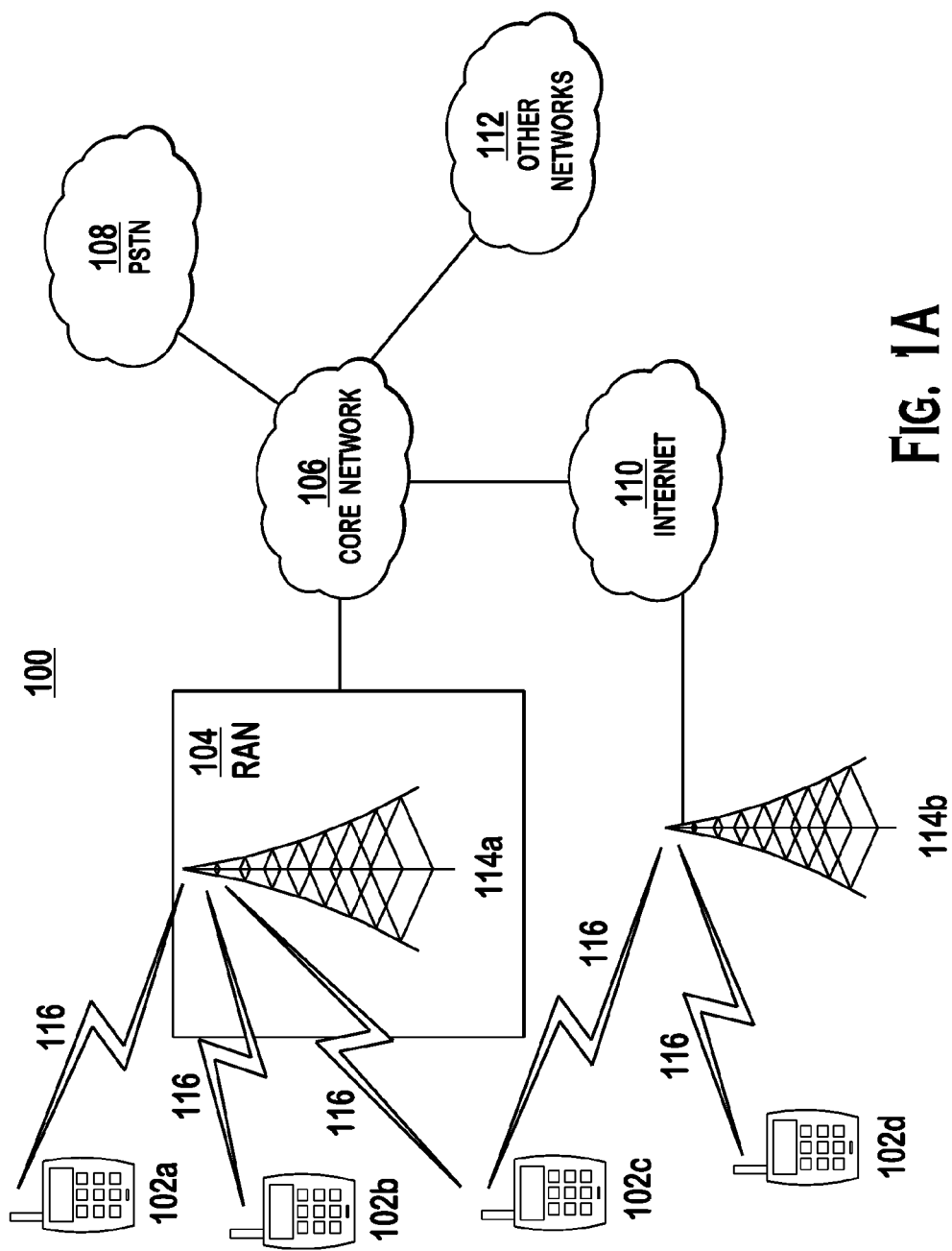
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
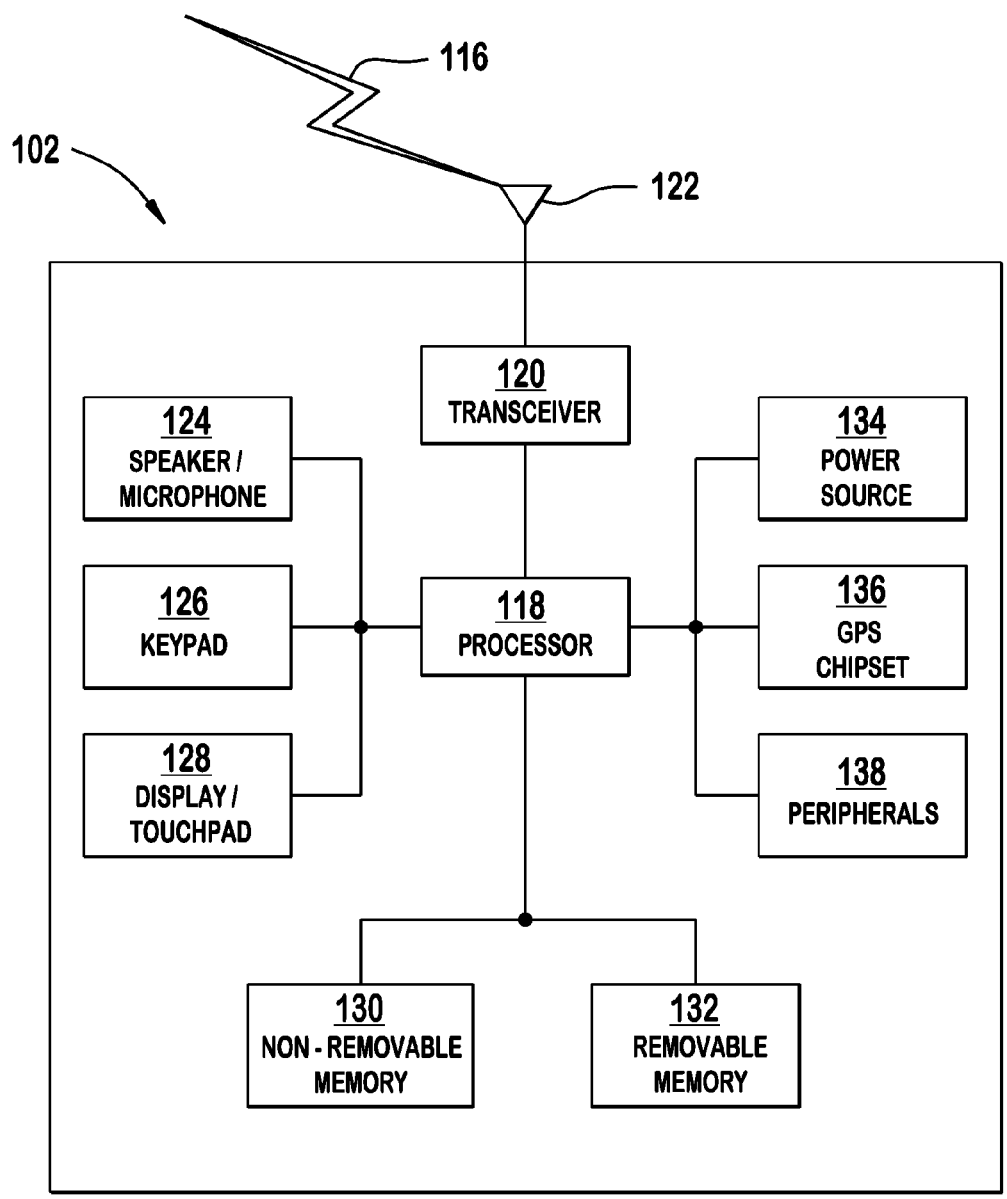
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Embodiments for beacon transmissions and neighbor discovery in a cognitive network and an infrastructure network are disclosed. Embodiments described below may be used to optimize cognitive network synchronization, (e.g., White Space), but may also be extended to any cases where a scanning device may scan through a list of channels. It may be noted that the embodiments disclosed herein may be implemented in any combination.

Figure 2:
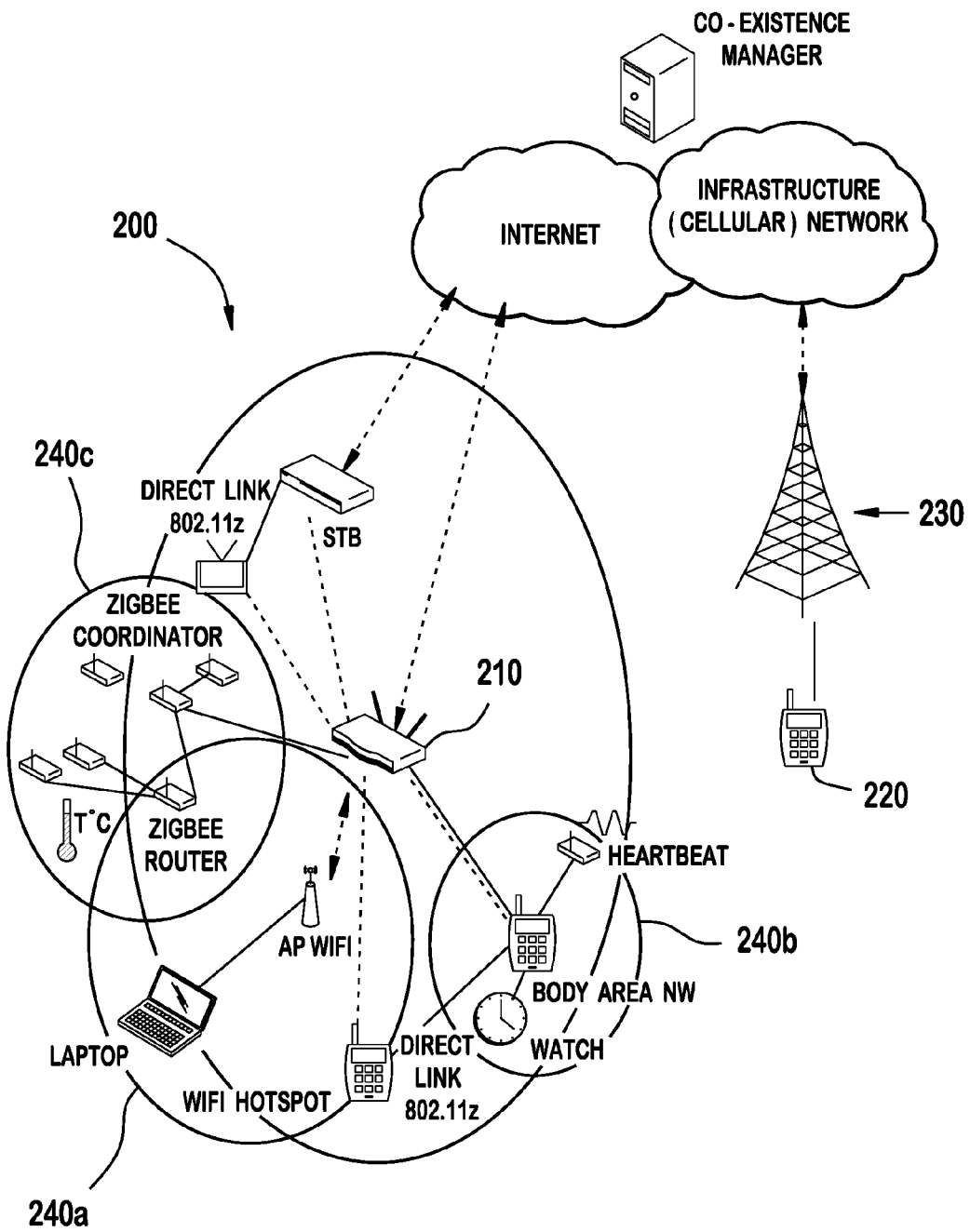
FIG. 2 is an example architecture of the intra-home or femtocell communication network.

FIG. 2 is an example architecture of the intra-home or femtocell communication network 200. The intra-home/femtocell network 200 may include a centralized gateway 210, (e.g., home eNodeB) and a plurality of wireless devices. A mobile device 220 moving into home may switch from the macro cellular network 230 to the centralized gateway 210. The intra-home/femtocell network 200 may include a plurality of networks 240a-240c comprising devices that are enabled with different RATs, (e.g., 802.11, Zigbee, etc.). The networks 240a-240c may be connected with the centralized gateway 210 through a new or existing interface. The centralized gateway 210 may have a channel management function to better assist the different-types of networks 240a-240c and help optimize spectrum usage and minimize interference. The centralized gateway 210 may serve for a better interference management of co-existence of different RATs, more efficient spectrum usage of different cognitive networks, quicker network formation of each network, quicker network discovery for the different RAT-enabled devices, faster direct link set-up in certain communication scenarios, (e.g., peer-to-peer (P2P) communications, multimedia distribution, etc.), or the like.

Figure 3:
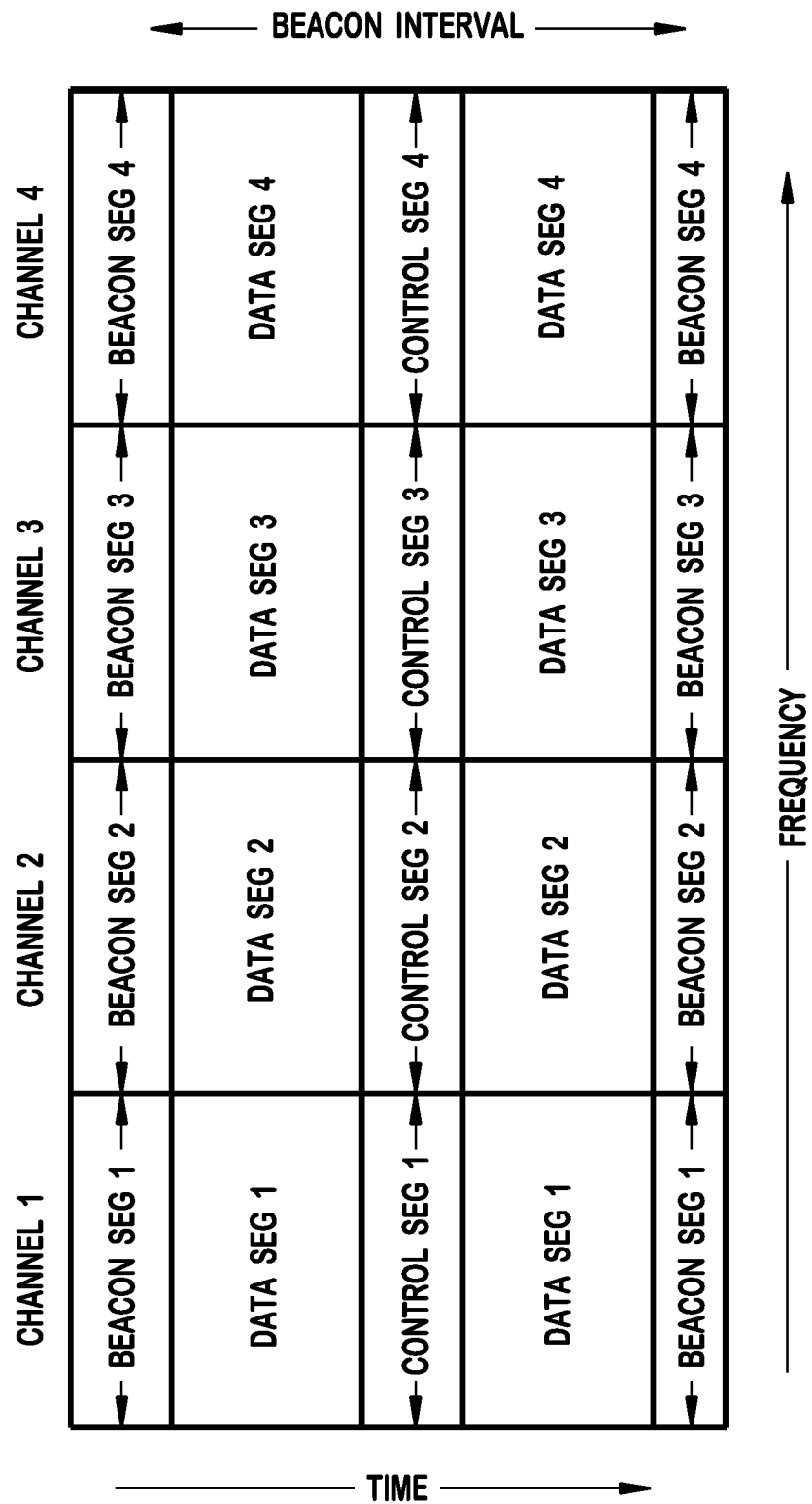
FIG. 3 shows transmission of four beacon segments over four channels simultaneously.

In accordance with one embodiment, a device sending a beacon, (hereinafter referred as "beacon device", e.g., access point (AP) or station), splits up the beacon in different segments and transmits the beacon segments over multiple channels simultaneously as an aggregated beacon. Hereinafter, the terminology "device" includes a WTRU and a base station (such as an AP or a Node-B). FIG. 3 shows transmission of four beacon segments over four channels simultaneously. The beacon segments may be transmitted with the control and data messages using the same physical channels in a time division fashion. It may be noted that FIG. 3 shows the case of devices which may support transmission and reception on four channels as an example, and the beacon may be split into any number of segments and the beacon segments may be simultaneously transmitted over any number of channels.

In an 802.11 network, a wireless device senses a channel before initiating a transmission and the beacon device may also win a contention before initiating a transmission of the aggregated beacon. In accordance with one embodiment, the beacon device may sense one of the plurality of channels, (such as a primary channel), for contention, and transmit the aggregated beacon over the plurality of channels once the beacon device wins the contention for the primary channel. In other words, if the primary channel is available for transmission, the other channels may also be available for the beacon device to transmit the aggregated beacon.

As the beacon is segmented, the beacon information, (which may be carried in information elements (IEs)), may be split among different segments of the beacon. Some IEs may be included in all or a predetermined number of beacon segments. For example, the IEs that may be included in all or a predetermined number of beacon segments include, but are not limited to, time stamp, beacon interval, capability, service set ID (SSID), supported rate, and/or channel information. By including one or more of these IEs in the beacon segments, a device scanning channels for a beacon, (hereinafter referred as "scanning device"), can synchronize quickly and start the association process as soon as it receives at least one of the beacon segments.

Figure 4:
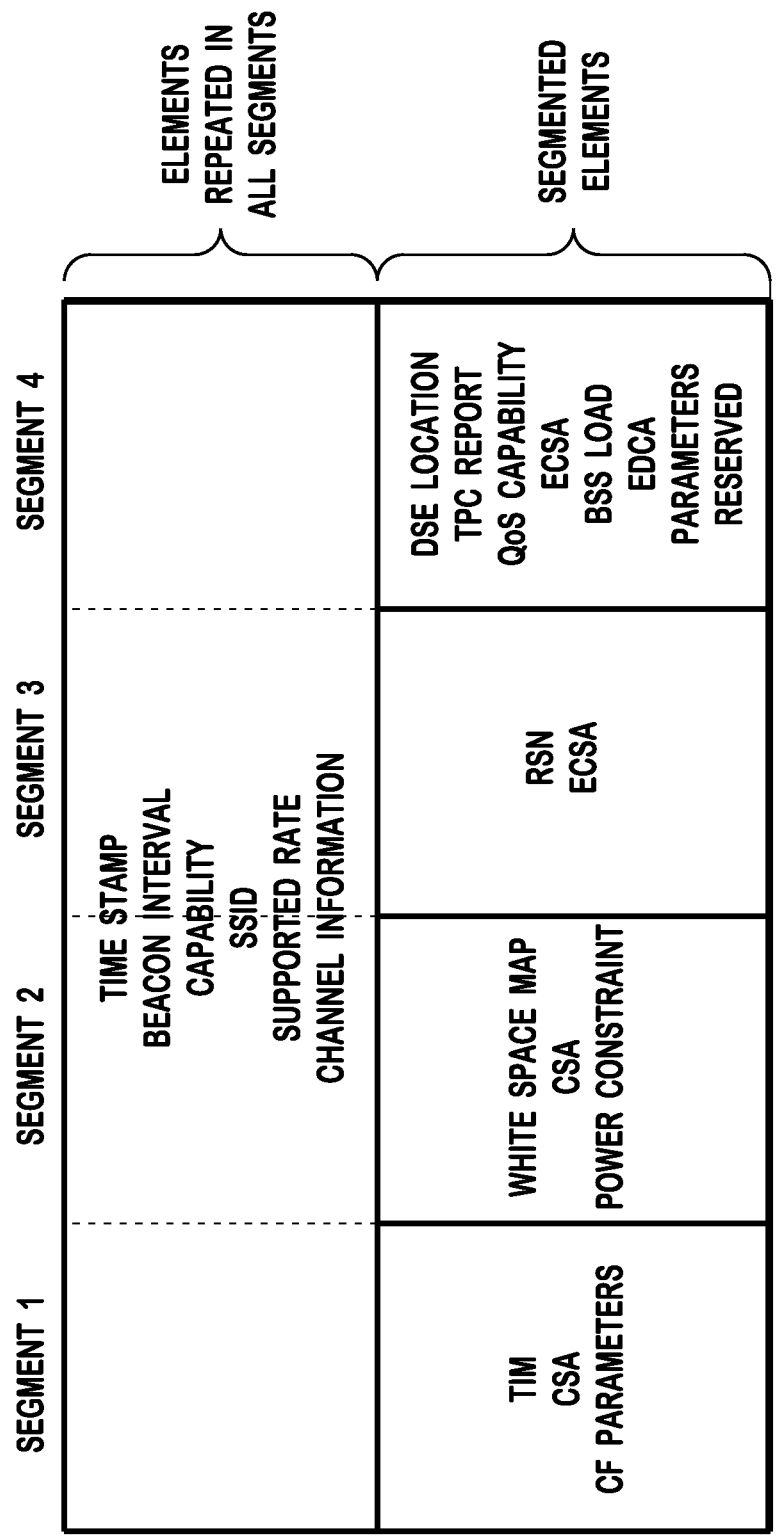
FIG. 4 is an example of information elements (IEs) in different beacon segments.

FIG. 4 is an example of IEs in different beacon segments. In this example, time stamp, beacon interval, capability, SSID, supported rate, and channel information are repeated in all or a predetermined number of beacon segments, and other information are split over the four beacon segments.

A new channel information IE may be included in the beacon segments in one or more segments. The channel information IE included in a beacon segment may help the scanning device discover the channels where other segments are sent. The channel information IE may include a frequency of the other channels on which the beacon segments are transmitted and an indication of the primary channel.

A spectrum usage mode IE may be included in the beacon or a beacon segment of the device, (e.g., AP), operating in the TVWS or other spectrum used by both primary and secondary users. The primary users may be the ones that are registered in the TVWS database, and the secondary users may be the ones that are not registered in the TVWS database. The secondary users may use a channel after sensing an available channel or receiving information about the available channel, but may vacate the channel when a primary user using the channel is detected. The spectrum usage mode field may indicate whether the AP and associated devices may operate as a Mode I/Mode II device, as a sensing-only device, or as a hybrid Mode I/Mode II and sensing-only device. A device operating as a Mode I device or as a Mode II device may transmit without sensing a channel to detect the presence of the primary users on the operating channel. A device operating as a sensing-only device may be subject to different regulations as it may be required to operate at a lower transmit power and may need to sense the channel before transmitting to detect the presence of primary users. Alternatively, the information included in the spectrum usage mode IE may be included in the capability field or any other field in the beacon or beacon segment.

In the event that the AP or devices support a hybrid Mode I/Mode II and sensing-only operation mode, the operation on some channels may be based on Mode I/Mode II mode and operations on the other channels may be based on sensing-only mode. An AP or devices may broadcast information of available channel(s) in a region that is determined either by accessing the TVWS database or by sensing channels in the region. The AP or devices may broadcast a channel assignment of which channels have been obtained from the TVWS database (Mode II mode) and which channels have been obtained through sensing (Sensing-only mode). This information may be included in the channel information IE, in other IE, or as a new IE of the beacon information. For channels obtained through sensing-only mode, (for example, the channels determined to be available by sensing the channels), or for channels which the AP has informed surrounding devices that are sensing-only mode channels, both the AP and the associated devices may be required to operate at a lower transmit power and may need to sense the channel before transmitting to detect the presence of the primary users. For channels that are indicated as obtained from the TVWS database, the AP and the devices may operate on that channel without sensing the channels to detect the presence of the primary users.

Figure 5:
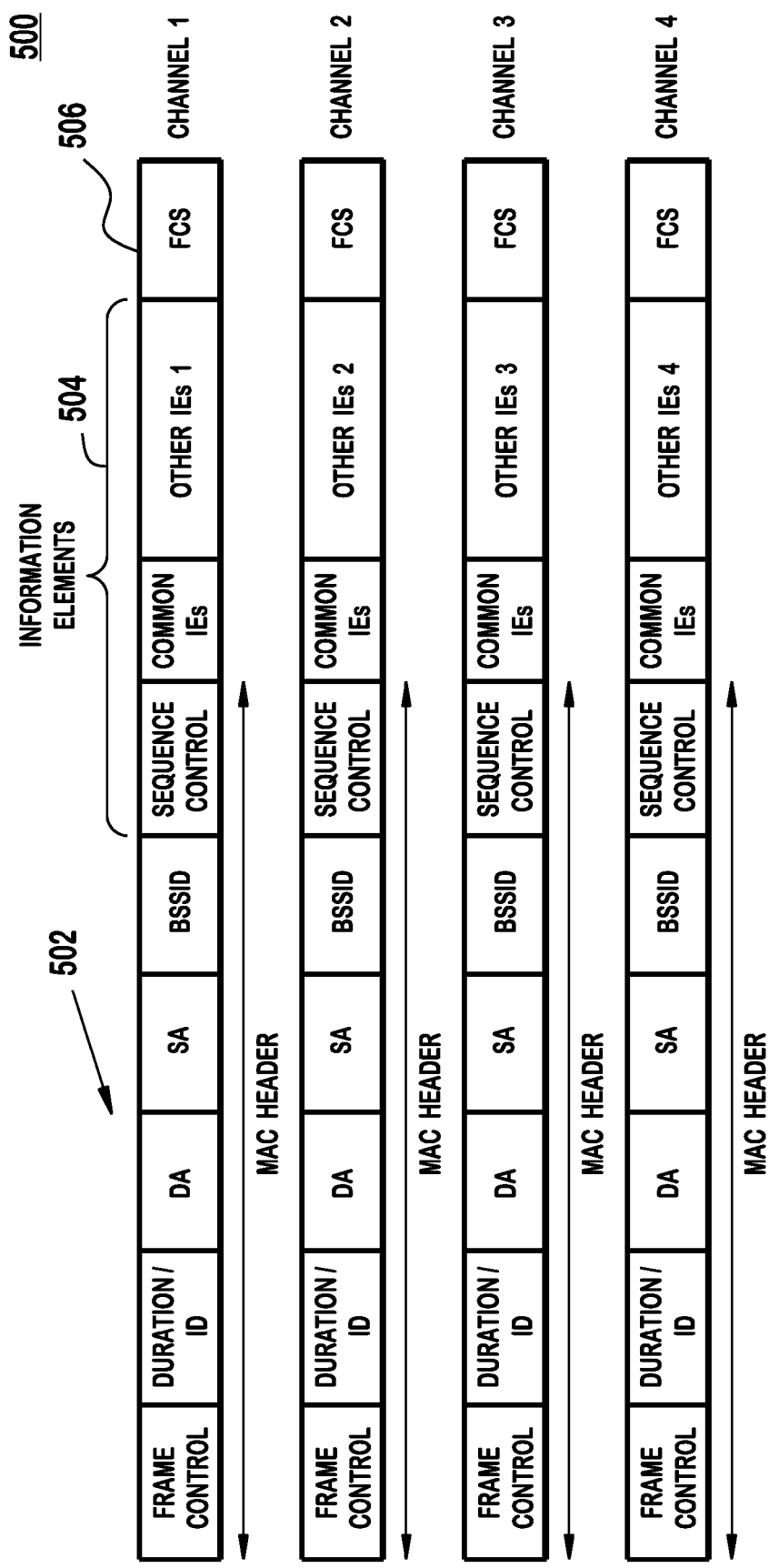
FIG. 5 shows the beacon segments transmitted over four channels.

FIG. 5 shows the beacon segments transmitted over four channels. A beacon frame 500 including a beacon segment includes a MAC header 502, a frame body 504, and a frame check sequence (FCS) 506. The frame body 504 includes common IEs that are included in all or predetermined number of beacon segments and other IEs that are spread over the beacon segments.

The scanning device may use its receivers, (e.g., four receivers), to scan for these beacon segments. The scanning device may scan multiple, (such as the example shown as four), different frequencies simultaneously and then move on to the next four frequencies until it finds at least one of the beacon segments. Once at least one beacon segment is received, the scanning device may then use the channel information IE included in the beacon segment to find other beacon segments to receive the complete beacon and start the association procedure.

Figures 6, 7:
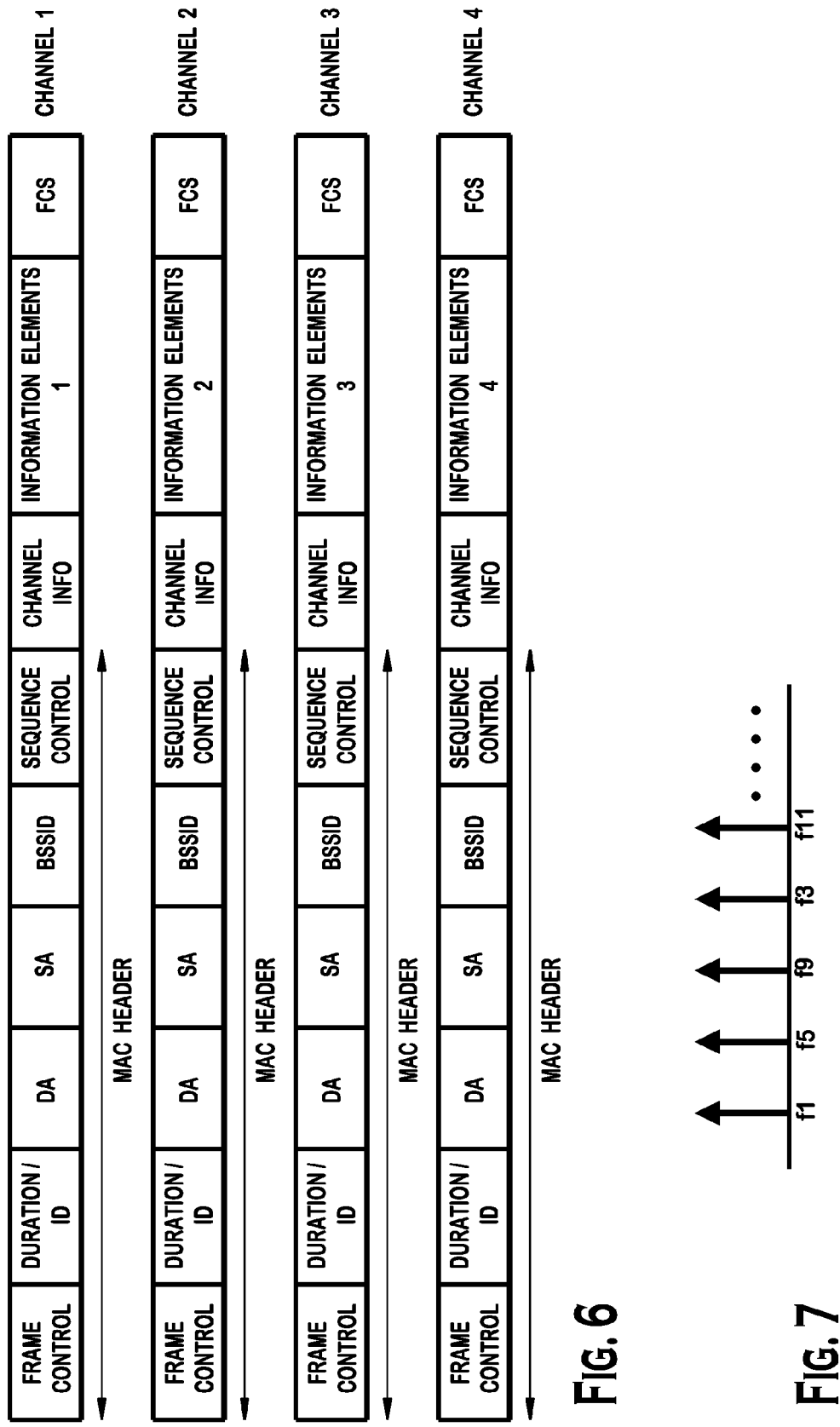
FIG. 6 shows transmission of beacon IEs spread over the four beacon segments.
FIG. 7 is an example beacon transmission in accordance with one embodiment.

Alternatively, all or predetermined number of the IEs of the beacon may be spread over the beacon segments as shown in FIG. 6. In this case, the channel information IE may be included in all or predetermined number of beacon segments.

Alternatively, the complete beacon may be repeated on all or predetermine number of channels instead of segmenting it. This may be useful for the devices which can receive on one channel.

In accordance with another embodiment, the beacon device may transmit a discovery beacon, in addition to the regular beacon (e.g., 802.11 WLAN beacon). The discovery beacon may be any one of the beacon segments in the embodiments described above, and the embodiments disclosed above may be combined with any embodiments related to the discovery beacon described in greater detail hereafter. The discovery beacon may include information to assist the scanning device in finding the operating channel on which the regular beacon, or other beacon segments are transmitted. The discovery beacon does not replace the regular beacon which contains the management information needed to operate in the network. The devices periodically listen to the regular beacon to remain synchronized to the network.

The discovery beacon frame may be part of the periodic regular beacon frame, or part of a different management frame or a new special management frame. In the latter case, the discovery beacon frame may include a subset of the content included in the regular beacon. Once the scanning device receives the discovery beacon, it extracts the information about the operating channel and tries to synchronize itself with the network accordingly.

If the discovery beacon is sent on a different channel than the operating channel, the beacon device may transmit the discovery beacon in a time division manner using the same radio as used for the operating channel. Alternatively, the beacon device may transmit the discovery beacon and the regular beacon simultaneously using multiple transmitters, (i.e., the discovery beacon is transmitted using a dedicated transmitter). Alternatively, the beacon device may transmit the discovery beacon and the regular beacon simultaneously using multiple radios, (i.e. using a dedicated transmitter/receiver on a channel dedicated for sending the discovery beacon).

The discovery beacon may contain one or more of following information: an information field which points to the operating channel (e.g., in the TV White Space), the bandwidth of the operating channel, the maximum allowable transmit power in the operating channel, the time delay between the discovery beacon and the periodic regular beacon, or the like. In case where there is more than one operating channel, the information about the operating channels may be included in the discovery beacon. Alternatively, the discovery beacon may include a list of free/available channels (obtained from the TV bands database or through sensing). This list is provided to the scanning stations and the stations may use the channels to set-up an ad hoc network, or a radio access network (RAN), etc.

The discovery beacon may include a pointer(s) to additional discovery beacon(s). For example, a discovery beacon on channel k may contain information for channel set K, and additionally state that information on channel set L is available in a discovery beacon sent on channel l. In a case where the discovery beacon contains information regarding free/available channels, there may be situations when this information may not fit in a single discovery beacon, (for example, if there are too many free/available channels). In this case, the discovery beacon may carry information for one channel set (K) as well as a pointer to another discover beacon (l), which may carry the information for another channel set (L). Alternatively, the discovery beacon may include a field or an information element which points to other discovery beacons present in the network. These may be segments of the same discovery beacon or instances of the same discovery beacon transmitted on multiple channels to reduce the discovery time. The discovery beacon may include a network identification, (such as a network ID or a masked version of the network SSID, etc.), and/or a network type indication if more than one network exists and is being pointed to by the discovery beacon. For instance, some networks may be tailored for real-time traffic and have parameters provisioned for this application. Alternatively, the network type indication may provide the capability of the 802.11 network, (e.g., whether a specific 802.11 amendment is supported or not).

In case of directional communication, (e.g., at 60 GHz), the discovery beacon may indicate the direction of the beacon device, (e.g., a sector number). Additionally, if the beacon device broadcasts the periodic beacon in multiple sectors, the discovery beacon may provide an indication of the beacon cycle. This may allow the scanning device to know when to monitor the sector. In case there is more than one network, the discovery beacon may provide an indication of the network load.

Embodiments for transmitting the discovery beacon are described hereafter. In accordance with one embodiment, the discovery beacon may be transmitted by the beacon device using a predetermined channel bandwidth. The channel bandwidth may be hard coded into the scanning device, or the scanning device may receive this information from the network. Since the scanning device is aware of the channel bandwidth, the scanning device does not need to scan all the possible bandwidths, (e.g., 5 MHz, 10 MHz, 20 MHz, and 40 MHz), but to scan a predetermined number of the bandwidths.

The discovery beacon may be transmitted on the same channel as the regular beacon. Alternatively, the discovery beacon may be transmitted in a frequency hopping manner such that it is on one channel for some time, and then moved to another vacant channel for some time, and then to some other vacant channel, and so on.

Once the scanning device finds the discovery beacon, it extracts the information about the operating channel from the discovery beacon and switches to the operating channel to receive the regular beacon. The scanning device may wait for the periodic regular beacon on the operating channel, or alternatively, may start an active scan for the beacon on the operating channel. After association the scanning device may continue to scan other discovery beacons using the same channel bandwidth. If the scanning device does not find any beacon after a complete scan with one bandwidth, the scanning device may switch to the next bandwidth. A beacon transmitted in this fashion may be pointed to by another beacon by simply indicating the channel number where the beacon is located.

In accordance with another embodiment, the discovery beacon may be sent with a smaller beacon interval than the periodic regular beacon. For example, in 802.11 networks, the regular beacon is normally transmitted every 100 ms. The discovery beacon may be transmitted, for example, every 50 ms or 25 ms. The discovery beacon frame may be shorter than the periodic regular beacon frame as it contains less information. The scanning device scans a channel for the discovery beacon for a duration approximately same to the discovery beacon interval. The scanning device scans for a smaller interval on one channel and then moves onto the next channel so that the complete scan duration may be reduced.

The scanning device may not be aware of the discovery beacon interval and may start off with the smallest scan interval, and if it does not find any beacon it may increase the scan interval. For example, assume that the discovery beacon is sent at 50 ms interval. The scanning device may initially set the scan interval to 25 ms, and if the scanning device is unable to locate the discovery beacon in the first round of scan, it may increase the scan duration to 50 ms and scan again. In this example, the scanning device may be able to find the discovery beacon at the second scan. Once the scanning device knows the discovery beacon interval, it may use the same scan duration for subsequent scans. A beacon transmitted in this fashion may be pointed to by another beacon by simply indicating the channel number where the beacon is located.

In accordance with another embodiment, the discovery beacon may be sent in a frequency hopping fashion. Instead of having the scanning device to jump from one frequency to another the beacon device may broadcast the beacon in a pseudo random fashion over the available spectrum one after the other. The scanning device may scan one or a few frequencies to look for the beacon.

FIG. 7 is an example beacon transmission in accordance with this embodiment. The beacon device transmits a discovery beacon on one frequency and moves onto another channel that may be selected randomly, and so on, (e.g., f1, f5, f9, f3, f11, . . . ). The scanning device may camp on a vacant channel and wait for the hopping discovery beacon train symbol to be transmitted on that channel. The scanning device performs an energy scan to detect a vacant channel with an energy level below a certain threshold, and stays on that channel waiting for the discovery beacon.

If the scanning device does not receive any beacon symbol on that channel after a given time duration, the scanning device may move on to the next available channel. Suppose each beacon pulse is about 2 ms long and there are about 100 channels. Taking into account the switching time between different frequencies it may take the beacon device about 200-300 ms to transmit the beacon in all channels, and the scanning device may be able to discover the network within 4-5 seconds. In this case, beacon pointing may be used to reduce the wait time. Specifically, each beacon hops over a subset of channels (or the subset of available channels within the subset of hopping channels) and may be pointed to by indicating the subset of hopping channels.

In accordance with another embodiment, the beacon device may send a discovery beacon on a channel selected from a prioritized list, known to both the beacon device and the scanning devices. For instance, the channel may be selected based on the regulatory class. A device operating under a regulatory class has the regulatory class information hard-coded in it. Table 1 shows the regulatory class and corresponding channel starting frequency, channel spacing and channel set in the United States. For example, the beacon device may go through the regulatory class in a vertical manner and select the first vacant channel as the discovery channel. The scanning device scans in the same order, (e.g., starts with the first channel in the regulatory class and scans down vertically one by one until it finds the discovery beacon).

For example, with reference to Table 1, the beacon device may start with channel 29 in the regulatory class 1 and channel starting frequency 0.050 GHz. If channel 29 is not vacant, the beacon device may move down to the next channel which is channel 88 in regulatory class 1 and channel starting frequency 0.051 GHz, and if this channel is not vacant then the beacon device may try to transmit on channel 89 in regulatory class 1 and channel starting frequency 0.052 GHz, and so on until the beacon device finds a vacant channel. The discovery beacon is then sent on the found vacant channel.

The operating channel of the device may be different from the discovery beacon channel. The scanning device goes through the channels in the same order. The scanning device starts with the first channel and moves down until it finds the discovery beacon. In regulatory class 1, the scanning device scans using a 40 MHz bandwidth, in regulatory class 2, the scanning device scans using 20 MHz bandwidth, and so on. With this embodiment, the scanning device may be able to find the discovery beacon by scanning just a few channels instead of scanning the whole spectrum. It is possible that the beacon device may find a vacant channel in the first column of the channel set, (i.e., 29, 88, 89, 90, 91, 90, . . . ), as shown in the Table 1. The discovery beacon is sent on the first available channel. The scanning device may perform twenty scans to find the discovery beacon. In case where no channel is available from the first column, the discovery beacon may be sent on the first vacant channel in the second column of the channel set, (i.e., 93, 94, 95, 96, 97, 96, . . . ). It may be noted that the channel may be selected in any order, (e.g., the list may be traversed from bottom to top, or any other manner).

TABLE 1

| Regulatory class | Channel starting freq. (GHz) | Channel spacing (MHz) | Channel set |
|---|---|---|---|
| 1 | 0.050 | 40 | 29, 93, 99, 105, 117, 123 |
|   | 0.051 |    | 88, 94, 100, 106, 118, 124 |
|   | 0.052 |    | 89, 95, 101, 107, 119, 125 |
|   | 0.053 |    | 90, 96, 102, 120, |
|   | 0.054 |    | 91, 97, 103, 115, 121 |
| 2 | 0.050 | 20 | 90, 96, 102, 108, 120, 126 |
|   | 0.051 |    | 27, 91, 97, 103, 109, 115, 121, 127 |
|   | 0.052 |    | 28, 86, 92, 98, 104, 116, 122 |
|   | 0.053 |    | 29, 87, 93, 99, 105, 117, 123 |
|   | 0.054 |    | 30, 88, 94, 100, 106, 118, 124 |
| 3 | 0.050 | 10 | 26, 32, 90, 96, 102, 108, 114, 120, 126 |
|   | 0.051 |    | 27, 85, 91, 97, 103, 109, 115, 121, 127 |
|   | 0.052 |    | 6, 28, 86, 92, 98, 104, 110, 116, 122, 128 |
|   | 0.053 |    | 29, 87, 93, 99, 105, 117, 123 |
|   | 0.054 |    | 30, 88, 94, 100, 106, 118, 124 |
| 4 | 0.050 | 5 | 7, 29, 87, 93, 99, 105, 111, 117, 123, 129 |
|   | 0.051 |   | 30, 88, 94, 100, 106, 118, 124 |
|   | 0.052 |   | 1, 25, 31, 89, 95, 101, 107, 113, 119, 125 |
|   | 0.053 |   | 26, 32, 84, 90, 96, 102, 108, 114, 120, 126 |
|   | 0.054 |   | 5, 27, 85, 91, 97, 103, 109, 115, 121, 127 |

In accordance with another embodiment, the discovery beacon may be transmitted on a side channel, (e.g., wired, cellular, or other connection), that may be on a different radio access technology than used for the regular beacon. This discovery beacon may carry information about the operating channel where the regular beacon may be found, or a list of free/available channels, (e.g., TVWS channels), etc. Alternatively, the discovery beacon on the side channel may indicate which channels in a different RAT (e.g., with high probability to be available) carry other discovery beacons. These discovery beacons on the side channel may provide more up-to-date information about the regular beacon, or about the rest of the spectrum.

Alternatively, the discovery beacon may be transmitted by stations that have already been associated with the network on the operating channel. These devices may be instructed to assist the network in transmitting the discovery beacon, for instance, during their idle times. The network may coordinate the discovery beacon transmissions from these stations so that they are transmitted in different channels.

The aggregated beacon may be used in a self organizing network (SON). In an SON ad-hoc network, a plurality of nodes may form a cluster, and a new node may scan for the existing cluster to join or establish its own cluster if no cluster is found. In the SON ad-hoc network, multiple nodes may be acting as a transmitter or receiver based on the need. A node may communicate directly with several other nodes around itself through its detected available channels, which are not limited by certain licensed or unlicensed bandwidth. The nodes around any node are called its neighbors. In the absence of a central controller, every node may discover its neighbors before the communication starts.

A cluster may include a mix of multi-carrier (MC) nodes and single carrier (SC) nodes. The MC nodes have the capability of transmitting an aggregated beacon, and sensing the beacons, over multiple channels (M channels). The number of channels used for beacon transmission may be different from the number of channels any node is capable of scanning at one time.

Figure 8:
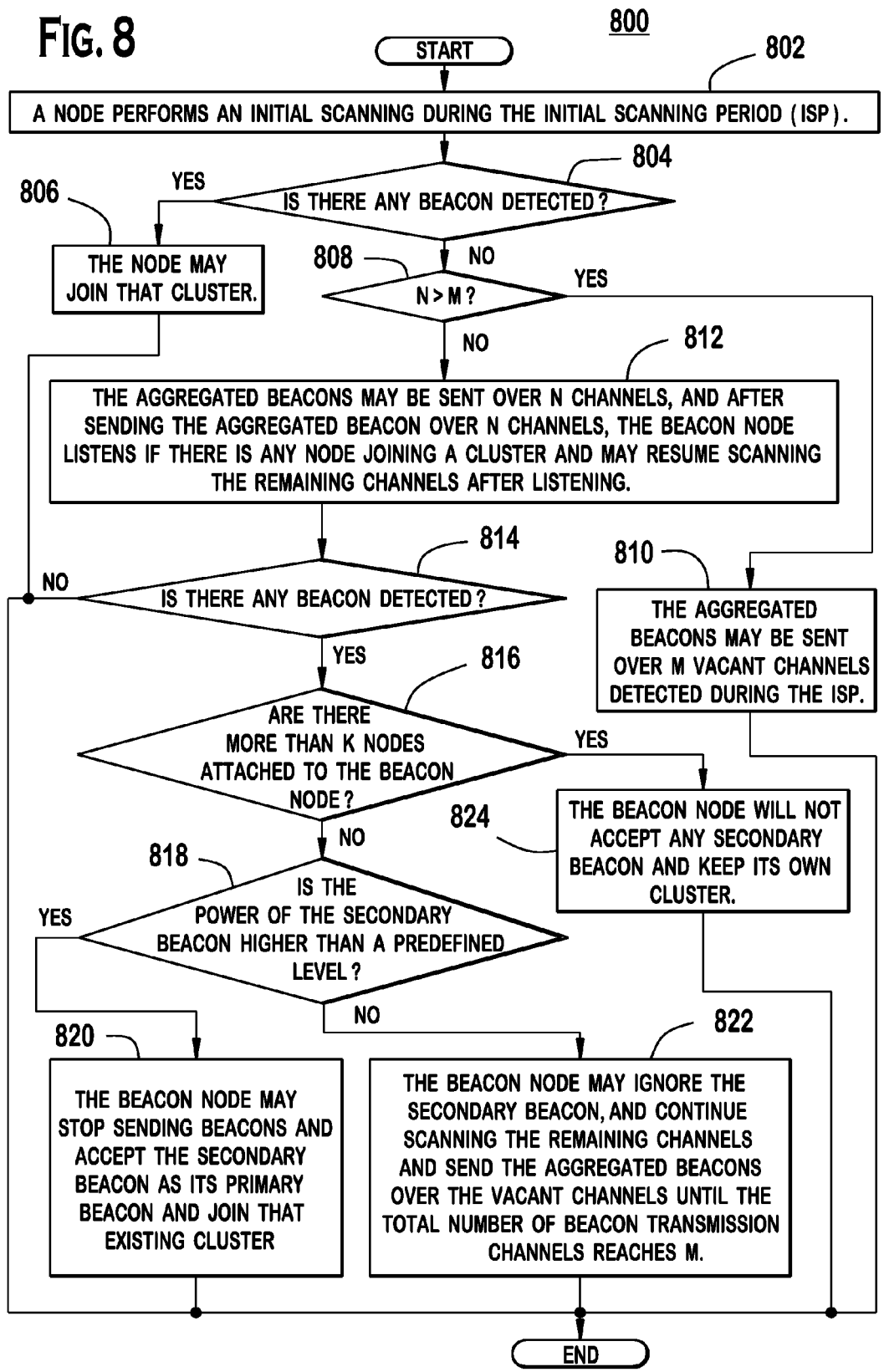
FIG. 8 is a flow diagram of an example process of neighbor discovery in a self organizing network (SON) in accordance with one embodiment.

FIG. 8 is a flow diagram of an example process of neighbor discovery in an SON in accordance with one embodiment. If a node has not been attached to any cluster or has not found any channel for sending the beacons, (e.g., centralized gateway needs to find available vacant channels to transmit the beacons), the node performs an initial scanning during the initial scanning period (ISP) (802). The node may scan multiple channels simultaneously. The node may select channels for scanning from the lowest available frequency (which may be either detected on its own or notified by its associated spectrum manager), or in any other order. For example, the node may scan channels f1, f2, f3, f4 at the first time and detect f2 is vacant, and if there is no beacon detected, then it scans channels f5, f6, f7 and f8 and find f6 is vacant, and so on. Alternatively, the node may pick the scanning channels randomly or according to any other rule.

After completion of the ISP, it is determined whether there is any beacon detected (804). If any beacon is detected, the node may join that cluster (806). If the node has not detected any beacon, the node may start sending aggregated beacons over multiple channels simultaneously, (i.e., the node may establish a new cluster). This node is referred as a beacon node. The beacon node may not be able to scan all the channels during the ISP. The number of vacant channels detected in the ISP is N. All these N vacant channels may be stored in the beacon node or sent back to the associated spectrum manager if there is any.

Figure 9:
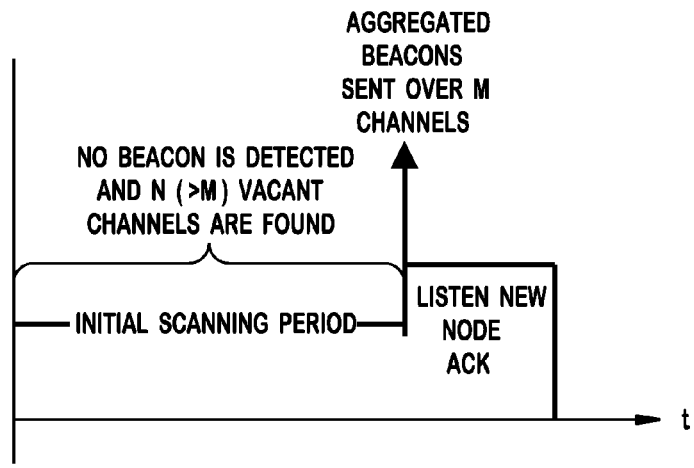
FIG. 9 illustrates an initial scanning period (ISP) and transmission of the aggregated beacons over a plurality of channels.

If N>M (808), the aggregated beacons may be sent over M vacant channels detected during the ISP (810). FIG. 9 illustrates the ISP and transmission of the aggregated beacons over M channels. In selecting the M channels out of N channels, the first M channels (e.g., with the lowest frequencies) in the N channels may be selected. Alternatively, the M channels may be selected randomly, or suggested by the associated spectrum manager, if there is any.

Figure 10:
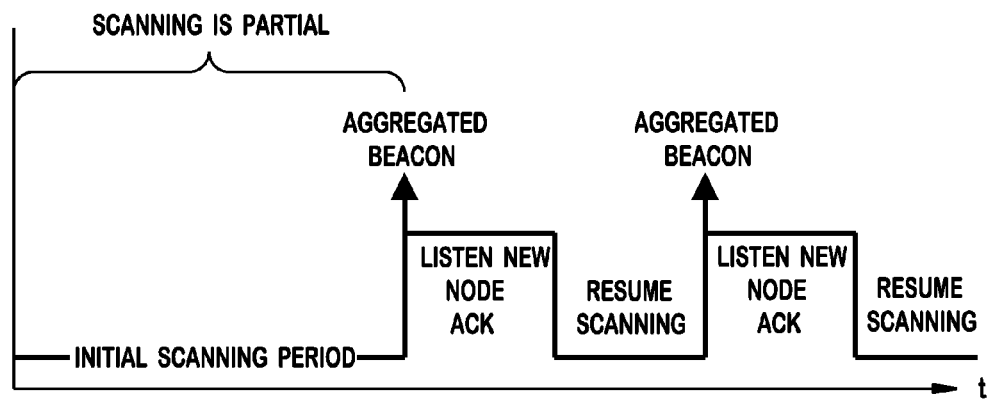
FIG. 10 illustrates the ISP and multiple iterations of the transmission of the aggregated beacon, listening, and resumed scanning.

If N<M (808), the aggregated beacons may be sent over N channels, and after sending the aggregated beacon over N channels, the beacon node listens if there is any node joining a cluster and may resume scanning the remaining channels after listening (812). FIG. 10 illustrates the ISP and multiple iterations of the transmission of the aggregated beacon, listening, and resumed scanning. The duration of the p-th scanning period (p>1) may be the same as the ISP or may be shorter than the ISP. The beacon node may continue searching the remaining channels and transmit the aggregated beacons until the total number of beacon transmission channels reaches M.

If a head node is already chosen, (e.g., intra-home communication network), the following steps may not be performed.

If another beacon, (i.e., a secondary beacon), is detected in the remaining channels during the scanning after the ISP (814), (which implies that there is another cluster existing around the beacon node), the beacon node may make a decision whether to accept this secondary beacon or not. For example, the decision may be made based on the received power of the secondary beacon and the number of nodes that are attached to the beacon node, or the like. It is determined whether there are more than K nodes attached to the beacon node (816) and the received power of the secondary beacon is higher than a predefined level (818).

If there are not more than K nodes attached to the beacon node (K>0 is a predefined parameter) and the received power of the secondary beacon is higher than a predefined level, the beacon node may stop sending beacons and accept the secondary beacon as its primary beacon and join that existing cluster (820). In this case, the beacon node may inform the K nodes which are attached to the beacon node the change of the cluster, (i.e., forwarding the new beacons to the K nodes).

If there are not more than K nodes attached to the beacon node and the received power of the secondary beacon is lower than or equal to a predefined level, the beacon node may ignore the secondary beacon, and continue scanning the remaining channels and send the aggregated beacons over the vacant channels until the total number of beacon transmission channels reaches M (822).

If there are more than K nodes attached to the beacon node, the beacon node may not accept any secondary beacon and keep its own cluster (824).

Figure 11:
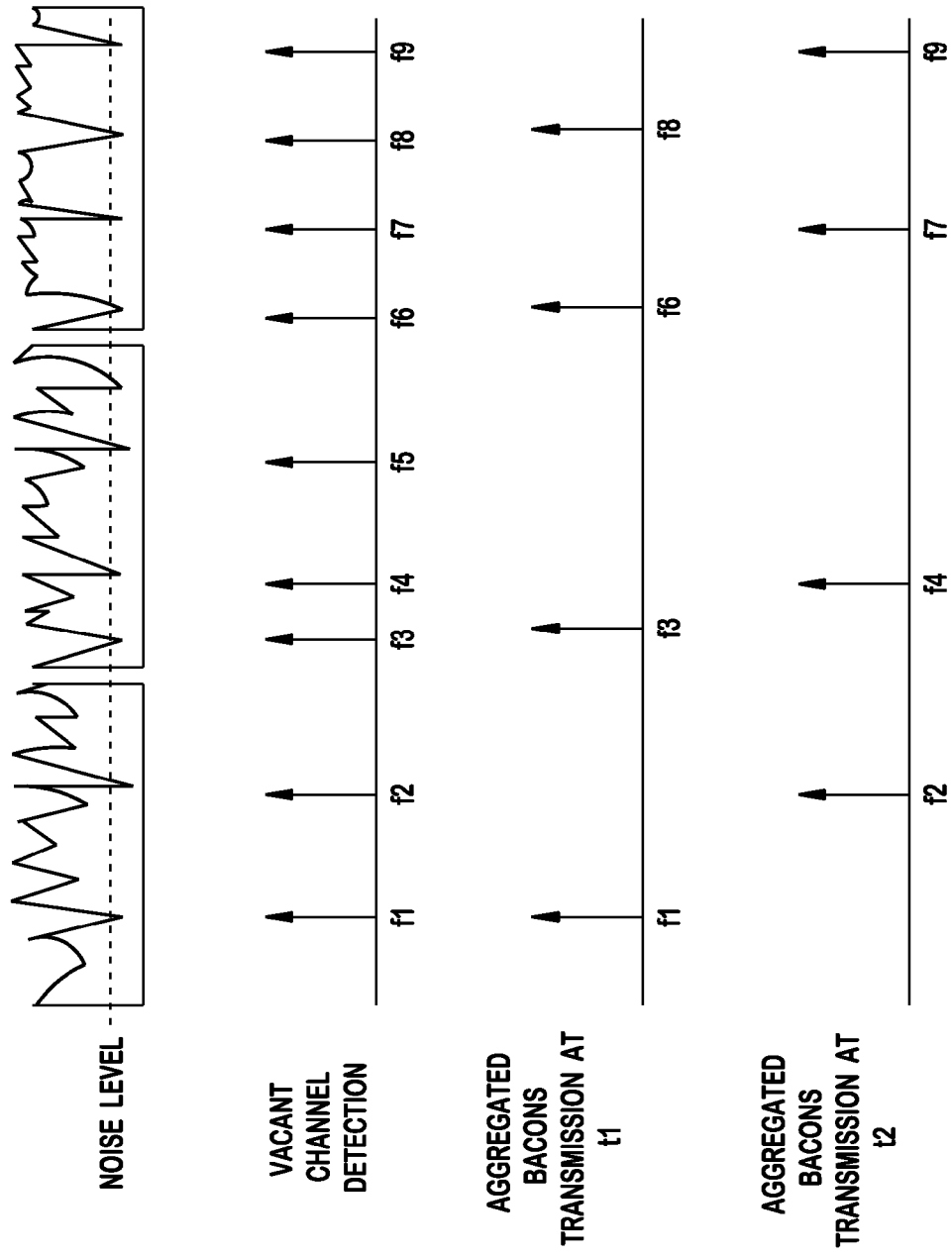
FIG. 11 illustrates detection of the vacant channels and transmission of the aggregated beacon over four channels each time via different channels.

Embodiments for gossip-based aggregated beacon transmissions are disclosed hereafter. In a cluster comprising a beacon node and a plurality of cluster nodes attached to the beacon node, the beacon node periodically sends a beacon. The beacon node may detect vacant channels and transmit an aggregated beacon over M channels simultaneously. The number of vacant channels may be larger than M. The M channels may be selected out of the vacant channels in accordance with any embodiments disclosed above. The beacon channels used for transmissions of the beacon from the beacon node may be changed each time. FIG. 11 illustrates detection of the vacant channels and transmission of the aggregated beacon over four channels each time via different channels. In FIG. 11, the beacon node transmits the beacon on channels 1, 3, 6, and 8 at t1, and transmits the beacon on channels 2, 4, 7, and 9 at t2.

The changing pattern of the channels may follow a certain criteria, (e.g., iteratively changing the beacon channels, based on the density of the discovered nodes, or based on the common available channels of the discovered nodes). For example, the cluster nodes may report the available channel sets to the beacon node if the regular nodes have the scanning capability, and the beacon node may send the beacon over the common available channels of the regular nodes attached to it.

When a cluster node k receives the beacon, it may forward, (i.e., gossip), the beacon in the available channels up to Mk channels. Mk may be smaller than the number of available channels detected by the cluster node k and may be a uniformly distributed random number between {0, M}. Not all the cluster nodes receiving the beacon need to gossip the beacon. The beacon forwarded by the cluster node is referred as a gossip beacon. This gossip may be based on certain criteria, (e.g., the received beacon power is below a predefined threshold).

Figure 12:
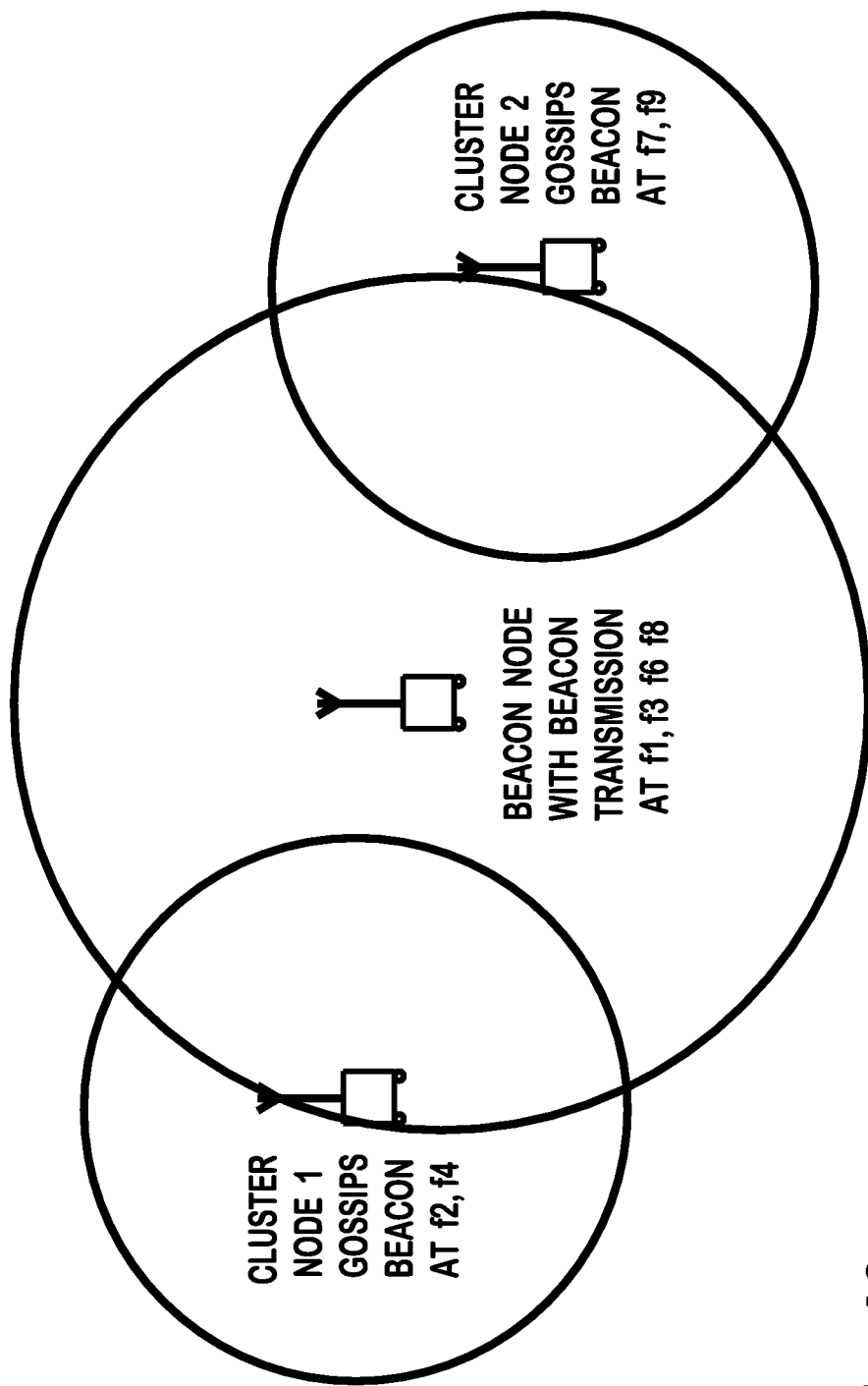
FIG. 12 illustrates the example gossip-based beacon transmission.

FIG. 12 illustrates the example gossip-based beacon transmission. In FIG. 12, the beacon node transmits the beacon on channels 1, 3, 6, and 8, and a cluster node 1 gossips the beacon on channels 2 and 4, and a cluster node 2 gossips the beacon on channels 7 and 9. To reduce the reception conflict of the original beacon and the gossip beacon, the transmission power of the gossip beacon may be set lower than the power of the original beacon sent by the beacon node. The gossip beacon and the original beacon may be distinguished in the beacon contents.

To avoid the collision, the cluster nodes may back off a random period, (e.g., uniformly distributed between 0 and T, T is a predefined system parameter), before forwarding the original beacon. When the new node detects the beacon, a hand-shaking process is performed. If a collision is detected by the new node, it may continue to search the beacon in the remaining channels.

Different contents of the beacon may be provided with a different level of error protection. For example, if the list of channels used for beacon transmission is included in the beacon and the channel list is carried in more than one beacon, the first beacon may include a pointer indicating that the channel list is not complete and the following beacon(s) includes other parts of the channel list. Other IEs in the beacon may also be split among different beacons such that the first beacon may contain an IE(s) indicating that there are more IEs coming in the next beacon(s). Any IEs supposed to be broadcasted may be sent over a plurality of beacons transmitted over a plurality of beacon intervals. Due to the different levels of importance of the beacon contents, unequal error protection or hybrid modulation may be used to provide different levels of protection to the beacon contents. Based on the level of importance of the beacon contents, a higher protection level, (e.g., lower coding rate/modulation order), may be used to encode and modulate the contents with a higher importance, while a lower protection level, (e.g., higher coding rate/modulation order), may be used to encode and modulate the contents with a lower importance.

For example, the list of channels used for beacon transmission may be considered of high importance and therefore may be given a higher level of protection. If one of the beacon channels is highly interfered with at a given location and the received quality of that beacon is low, the unequal error protection or hybrid modulation may allow a receiving node to correctly decode the list of channels used for beacon transmission. After correctly decoding the list of channels used for beacon transmission from the noisy beacon, the node may be able to jump to the other beacon channels, which may have a higher signal quality, to decode the remaining contents of the beacon.

Devices may employ a low quality oscillator circuitry with larger initial frequency offsets, and this may hamper synchronization and the cluster formation timing. In accordance with one embodiment, the initial frequency offset may be reduced by leveraging the existing networks deployed in the same geographical area where the dedicated synchronization channel ensures the quality of service (QoS) within the network coverage area by system design.

In accordance with one embodiment, each node having multiple RAT capability may start searching for a synchronization channel based on a priority list of RATs. For example, nodes may search on the raster frequencies defined by universal mobile telecommunication systems (UMTS) frequency division duplex (FDD) standards to find a synchronization channel. Once synchronized, the nodes may start searching for the beacon of its own network. The base station of the existing network may be elected based on predefined policies such as the highest measured signal code power, the cell ID, the type of RAT, and other parameters. For example, the nodes may perform received signal strength indicator (RSSI) measurements on certain cellular bands, (e.g., global system for mobile communications (GSM), UMTS, or long term evolution (LTE) bands, etc.), and select a base station with the highest RSSI. The synchronization may be even at a slot level such that the nodes may utilize the established timing in their respective identified vacant frequencies to synchronize, form clusters, and/or set communication links.

Figure 13:
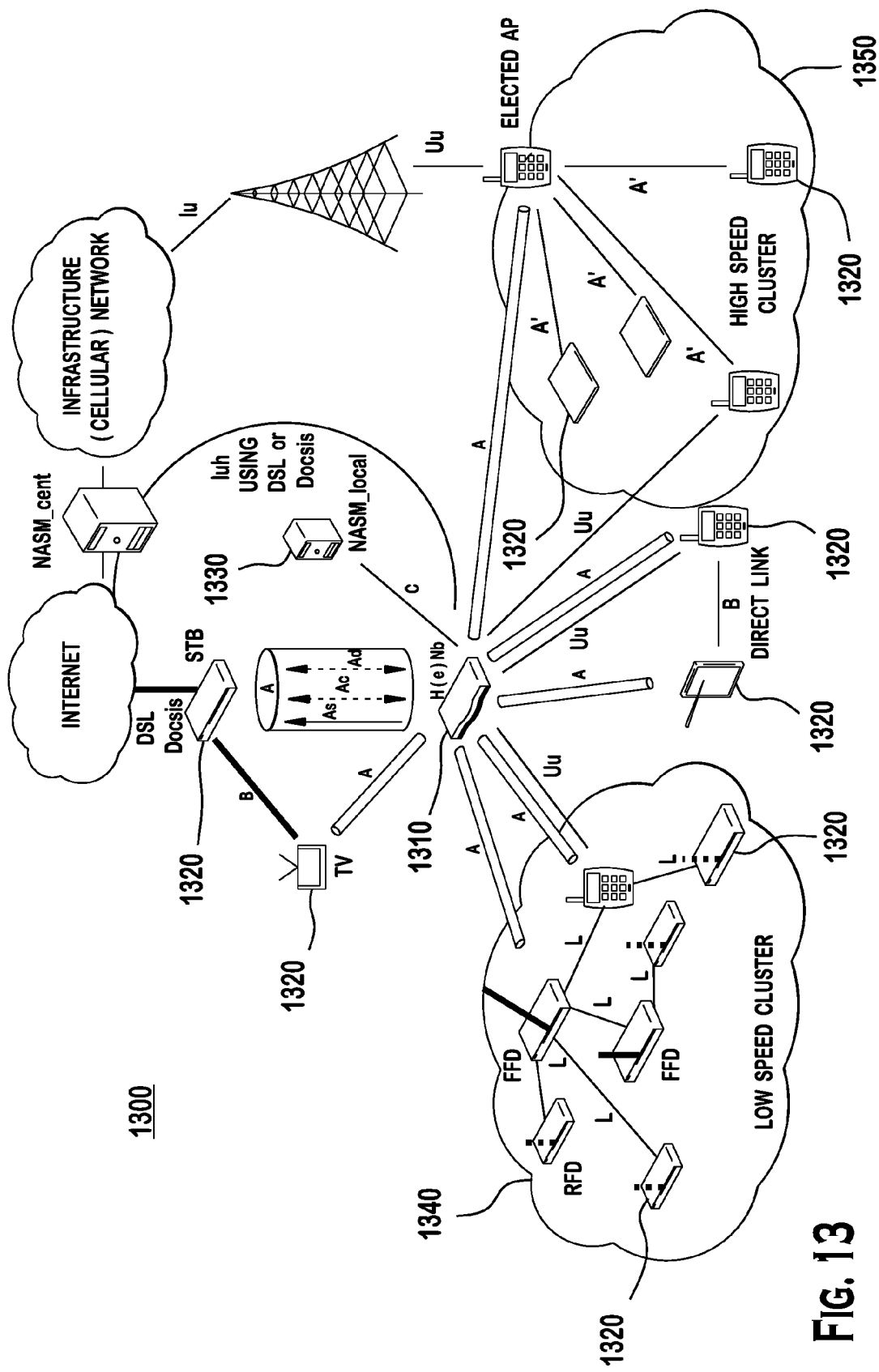
FIG. 13 is an example intra-home communication network with interfaces between nodes.

Some examples are provided for the beacon transmissions in some communication scenarios, (e.g., intra-home communication network). FIG. 13 is an example intra-home communication network 1300 with interfaces between nodes. The network 1300 includes a home (evolved) NodeB (H(e)NB) 1310, a plurality of wireless devices 1320 including a TV and a set-top box (STB), a network assistance and spectrum manager (NASM) 1330, etc. Some devices may form clusters (e.g., low speed cluster 1340 and high speed cluster 1350).

The As interface provides a synchronization channel between the H(e)NB 1310 and the wireless devices 1320. The Ac interface is a protected control channel between the H(e)NB 1310 and the wireless devices 1320. The Ad interface provides a data channel between the H(e)NB 1310 and the wireless devices 1320. The B interface provides a direct link data channel between two wireless devices 1320. The C interface is provided for communication between the H(e)NB 1310 and the NASM 1330. The Uu interface is an LTE or WCDMA standard interface between the H(e)NB 1310 and the wireless devices 1320. The Iuh interface is an LTE or WCDMA standard interface between the H(e)NB 1310 and an H(e)NB gateway. The A' interface is a generic name for high speed Ad Hoc interface 1350, (e.g., 802.11n). The L interface is a generic name for low speed ad hoc interface 1340, (e.g., Zigbee). The A-interface provides a synchronization channel (As), a control plane channel (Ac), and a data plan channel (Ad) to the centralized gateway, (e.g., HeNB), to communicate with the registered devices that may not possess the Uu interface, which is the 3GPP interface between the centralized gateway and the 3GPP capable devices.

To be synchronized with the centralized gateway and directed by it, the registered device may get the synchronization signal and control information from the centralized gateway periodically. This information may be protected. The aggregated beacon transmission scheme may be used in the synchronization channel or control channel to send out the synchronization signal or the control information such that the necessary information may be transmitted over multiple beacon channels (or bands).

The beacon channels may be informed directly by the NASM 1330 if the information of available vacant channels is available. In case where the centralized gateway, (i.e., H(e)NB 1310), is just turned on and every wireless device in the network is in the initialization stage, the associated NASM 1330 may be short of the accurate spectrum availability information.

The determination of the beacon channels may be performed as follows. Given an ISP, the centralized gateway 1310 may first scan the candidate channels (which may be informed by the NASM 1330 to narrow down the number of searching channels) during the ISP. If the number of vacant channels N is smaller or equal to M (the number of pre-defined beacon channels), the centralized gateway 1310 may transmit beacons over these vacant channels and continue scanning while emitting the beacons or may get an updated available channel information from the NASM 1330 if there is any. If the number of vacant channels N is larger than M, the centralized gateway 1310 may either decide on its own or, alternatively, feedback its detected vacant channel information to the NASM 1330 and let the NASM 1330 guide its vacant channel selection for aggregated beacon transmission.

To increase the transmission range of the synchronization signal/control signal, gossip-based aggregated beacon transmission may be applied. Any registered device, which receives the synchronization/control information from the centralized gateway 1310, if it is available, may ask the centralized gateway 1310 help for the information of available vacant channels around its location. The device may then start to send out the aggregated beacons over these vacant channels to relay the synchronization or control message.

When devices 1320 start to register with the centralized gateway 1310, (for example, for point-to-point multimedia distribution services), the devices 1320 need to find out the synchronization signal sent by the centralized gateway 1310 among large number of available channels. Assuming the device 1320 has the ability to search multiple bands simultaneously, the time used for the centralized gateway discovery may be significantly reduced with the aggregated beacon, and the beacon coverage may be extended with the gossip-based aggregated beacon transmissions.

A centralized gateway 1310 sends out the beacons over multiple channels, for example, f2 at Band 1, f6 at Band 2, f10 at Band 3, f14 at Band 4 (assuming that one band comprises four frequencies). The beacons may contain the control information or synchronization information or some other information. A wireless device 1320, which has the ability of multiple-band search and wants to register with the centralized gateway 1310, starts to search the beacon transmitted by the centralized gateway 1310. The device may randomly select one band to search, (e.g., band 2). The device 1320 may detect the beacon transmitted in f6 of band 2. If the aggregated beacon is not used, (e.g., the beacon is transmitted in a single channel and the device is capable of scanning one frequency channel of any one of the bands at one time), the device 1320 may take longer time to detect the beacon.

If the device 1320 detects the beacon within a predetermined time period (that may be a predefined system parameter), it registers with the centralized gateway and obtains the related control information or synchronization information. If it is available, the device 1320 may request the centralized gateway 1310 help for the information of available vacant channels around its location. The device 1320 may then start to send out the aggregated beacons (i.e., gossip beacon) over these vacant channels. Devices staying out of the original aggregated beacon's transmission range may detect the gossip beacons forwarded by the device.

If the device 1320 cannot detect the beacon sent by the centralized gateway 1310 during a predetermined time period (that may be a predefined system parameter), the device 1320 may start to search the cluster beacon and determine if there is any existing cluster. If the device 1320 cannot find out the cluster beacon, it may become the cluster head, form its own cluster and send out the cluster beacon over its detected vacant channels (aggregated beacon may be transmitted in the cluster beacon transmission as well). If the device 1320 detects the cluster beacon transmitted by any cluster head or relay node in the cluster, the device 1320 may join the cluster. The cluster beacon from the cluster may be different from the beacon sent from the centralized gateway 1310. The former one is used for cluster discovery and the latter one is used for registration with the centralized gateway.

If the device 1320 becomes the cluster head of the newly formed cluster, it may continue scanning the remaining channels and find out the centralized gateway beacon. Alternatively, the device may broadcast a probe message over the vacant channels to ask for the centralized gateway beacons and register with it. Any node around (which may be any regular device registered with the centralized gateway or the centralized gateway) receiving this probe request may relay/transmit the beacon to this device to assist its registration with the centralized gateway.

If the device 1320 becomes a new member of the existing cluster, (such as clusters 1340 or 1350), it may either send a request message to its cluster head, asking for the centralized gateway information if the cluster head registers with it or send a broadcast message over the vacant channels to ask for the centralized gateway beacons and register with it. Any node around (which may be any regular device registered with the centralized gateway or the centralized gateway) receiving this request may relay/transmit the centralized gateway beacon to this device to assist its registration.

The aggregated beacon may be used in network discovery in machine-to-machine (M2M) communications. Assume that there is no device registered with the centralized gateway in M2M communications and the Zigbee network is formed. After the Zigbee network formation, a Zigbee-enabled mobile device passing the Zigbee network detects the Zigbee beacon and may associate with the Zigbee coordinator or any Zigbee router of the Zigbee network. Making use of the aggregated beacon, the Zigbee-enabled mobile device may distribute the modified beacons, which is different from the Zigbee beacon, over multiple available channels. The available channels may be informed by the centralized gateway or may be scanned on its own if the Zigbee-enabled mobile device has a scanning capability. The contents of the modified beacons may include the beacon channels sent by its parent, (i.e., the Zigbee coordinator or other Zigbee router), which may narrow the number of searching channels for the Zigbee devices without being associated with the Zigbee network.

The Zigbee-enabled device may determine the channel where the Zigbee beacon is transmitted from its parent, (i.e., Zigbee coordinator or Zigbee router). The Zigbee-enabled device may request assistance of the centralized gateway regarding the available vacant channels for its transmission of the aggregated beacons. The centralized gateway (or the NASM) may notify the Zigbee-enabled device the vacant channels. The Zigbee-enabled device may emit the aggregated beacons over the available vacant channels. The aggregated beacons may contain the related Zigbee control information, (e.g., the channel where its parent's Zigbee beacon is transmitted, etc.). Any Zigbee-enabled device not associated with the Zigbee network may detect the aggregated beacons and obtain related message on the Zigbee beacon channels.

Alternatively, the cluster head or the Home (e)NodeB as illustrated in FIG. 13, may generate a low power synchronization channel that contains synchronization information and information about the control channel. The cluster head broadcasts the synchronization channel to the rest of the cluster on at least one of the predetermined set of frequencies, $S_f = \{f_1, f_2, \ldots, f_n\}$. The bandwidth of the synchronization channel may be large. The set of frequencies $S_f$ may represent a subset of the available spectrum to enable a faster detection of the synchronization channel. The nodes in the cluster initially scan through $S_f$ until they detect the synchronization channel on a specific channel. The nodes may use the information from this synchronization channel to tune to the control channel. When a node detects that the quality of the beacon in the synchronization channel is below a certain threshold value, (for instance, by using quality of service (QoS) measure or a signal-to-noise ratio (SNR) measure), it may try to relay the beacon in a frequency that belongs to $S_f$. The relay node may add its hop number to the beacon.

The frequency chosen by the relay node may or may not be different from the frequency on which the relay node received the beacon. The depth of the relaying, (e.g., the number of times a beacon is relayed), may be controlled through the hop number. For instance, the beacon may be relayed if the hop number is less than a predetermined maximum hop count (K). The synchronization channel may be decoupled from the control channel.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for use in an IEEE 802.11 wireless transmit/receive unit (WTRU) capable of receiving a plurality of radio frequency (RF) bands, each band including a respective plurality of channels, the method comprising:
   scanning at least one channel in a first RF band to detect IEEE 802.11 beacon information;
   receiving a first beacon from an access point (AP) via the at least one channel; and
   receiving a second beacon from the AP via a second channel in a second RF band based on a beacon interval, corresponding to the second RF band, that is indicated by the first beacon;
   wherein the second beacon is received directionally on the second RF band;
   wherein the second RF band comprises a 60 gigahertz frequency; and
   wherein the first RF band does not comprise a 60 gigahertz frequency.

2. The method of claim 1 wherein multiple channels are scanned simultaneously.

3. The method of claim 1 further comprising:
   performing an association procedure based on information received in the second beacon.

4. The method of claim 1, wherein the first beacon includes a network identification.

5. The method of claim 1, wherein the first beacon includes a network type identification.

6. The method of claim 1, wherein the second beacon includes a sector number.

7. An IEEE 802.11 wireless transmit/receive unit (WTRU) capable of receiving a plurality of radio frequency (RF) bands, each band including a respective plurality of channels, the WTRU comprising:
- a transceiver configured to scan at least one channel in a first RF band to detect IEEE 802.11 beacon information from an access point (AP),
- receive a first beacon via the at least one channel, and
- receive a second beacon from the AP via a second channel in a second RF band based a beacon interval, corresponding to the second RF band, that is indicated by the first beacon;
- wherein the second beacon is received directionally on the second RF band;
- wherein the second RF band comprises a 60 gigahertz RF band; and
- wherein the first RF band does not comprise a 60 gigahertz RF band.

8. The WTRU of claim 7 wherein the transceiver is configured to scan multiple channels simultaneously.

9. The WTRU of claim 7 further comprising:
- a processor configured to perform an association procedure based on information received in the second beacon.

10. The WTRU of claim 7, wherein the first beacon includes a network identification.

11. The WTRU of claim 7, wherein the first beacon includes a network type identification.

12. The WTRU of claim 7, wherein the second beacon includes a sector number.

* * * * *

UNITED STATES PATENT AND TRADEMARK OFFICE
CERTIFICATE OF CORRECTION

PATENT NO. : 10,237,812 B2
APPLICATION NO. : 13/034472
DATED : March 19, 2019
INVENTOR(S) : Ahmad et al.

Page 1 of 1

It is certified that error appears in the above-identified patent and that said Letters Patent is hereby corrected as shown below:

On the Title Page

Right column, item (56), after the word "simultaneously.", delete "A certain information" and insert therefor --Certain information elements--.

In the Specification

At Column 5, Line 67, after the words "non-removable memory", delete the number "106" and insert therefor --130--.

At Column 6, Line 61, after the words "non-removable memory", delete the number "106" and insert therefor --130--.

At Column 6, Line 62, after the words "non-removable memory", delete the number "106" and insert therefor --130--.

At Column 11, Line 51, after the word "a duration approximately", delete the words "same to" and insert therefor --the same as--.

In the Claims

At Column 21, Line 8, Claim 7 after the words "in a second RF band based" insert the word --on--.

Signed and Sealed this
Fifth Day of May, 2020

Andrei Iancu
*Director of the United States Patent and Trademark Office*